United States Patent Office 3,701,800
Patented Oct. 31, 1972

3,701,800
CIS 1-METHYL-2-ISOPROPENYL-CYCLOBUTYL ACETIC ACID
Rene C. Zurfluh and John B. Siddall, Palo Alto, Calif., assignors to Zoecon Corporation, Palo Alto, Calif.
No Drawing. Original application Oct. 22, 1969, Ser. No. 870,009. Divided and this application June 25, 1971, Ser. No. 156,944
Int. Cl. C07c 61/16, 69/74
U.S. Cl. 260—468 H    3 Claims

ABSTRACT OF THE DISCLOSURE

Stereospecific synthesis of sex attractant component of the boll weevil by halogenation of 6-methylbicyclo [4,2,0]octan-2-one or ketal thereof, dehydrohalogenation, methylation of ketone, mild oxidative cleavage to desired cis isomer, Wittig conversion of ketone to methylene and reduction of acid or ester thereof to cis 2-(1'-methyl-2'-isopropenyl-cyclobutyl)ethanol.

---

This is a division of application Ser. No. 870,009, filed Oct. 22, 1969.

This invention relates to a novel synthesis of cis 2-(1'-methyl-2'-isopropenyl-cyclobutyl)ethanol, a component of the male boll weevil's sex attractant, and to novel intermediates therefor.

Pheromones such as sex pheromones in their use as chemical insect control agents have strict structural requirements for effectiveness. A single isomer is often responsible for the activity of a pheromone or compound as a sex attractant and any appreciable amount of other isomers may destroy or depress the receptivity of the insert to the attractant. The present invenion provides an advantageous method for the stereospecific preparation of cis 2-(1'-methyl - 2' - isopropenyl-cyclobutyl)ethanol, a component of the male boll weevil's sex attractant. The components of the male boll weevil's sex attractant have been reported in Chemical and Engineering News, 36–38, Apr. 28, 1969.

The novel synthesis of the present invention can be outlined as follows:

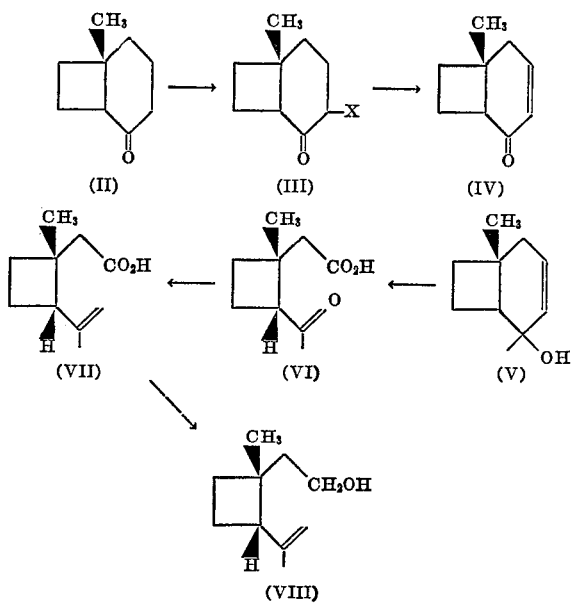

In the practice of the above synthesis, 6-methylbicyclo-[4,2,0]octan-2-one (II) is first converted into the bicyclic alcohol (V) with introduction of functions which al-low cleavage of the cyclohexene ring into two side chains having the desired cis configuration. This conversion is practiced by chlorination or bromination of II to the halo ketone (III; X is bromo or chloro) and dehydrohalogenation of III to the enone (IV) which is methylated to obtain the alcohol (V). Halogenation of the bicyclic ketone (II) is accomplished by treatment with a halogenating agent, such as phenyltrimethylammonium tribromide, pyridinium hydrobromide perbromide, and the like, in an organic solvent such as the ethers to form the bromo or chloro ketone (III) or bromine or chlorine in a halogenated hydrocarbon solvent. Prior to halogenation, the ketone (II) can be converted into the corresponding cycloketal thereof by treatment with ethyleneglycol, 1,3-propanediol, 1,4-butanediol or 2,3-butanediol in the presence of a catalyst such as p-toluenesulfonic acid monohydrate in hydrocarbon solvent. The ketal group is then removed by acid hydrolysis after formation of III or IV to regenerate the keto group. The halo ketone (III) or ketal thereof is dehydrohalogenated using an alkali metal salt such as lithium carbonate, lithium carbonate-lithium bromide, and the like, in an organic solvent such as dimethylacetamide or using a tertiary amine such as collidine with or without an organic solvent to yield the bicyclic enone (IV) or the ketal thereof and an unsaturated ketone of Formula IV' or the ketal thereof. The unsaturated ketone (IV') is isomerized to the enone (IV) by treatment with base such as about 0.1 equivalents of potassium t-butoxide or sodium ethoxide in the corresponding alcohol. Isomerization can also be done using oxalic acid in methanol or dilute HCl in tetrahydrofuran. Other bases can be used such as an alkali metal carbonate in methanol.

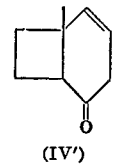

(IV')

A compound of Formula IV is then methylated using a methyl magnesium halide or methyl alkali metal such as methyl lithium or methyl sodium to yield the alcohol (V), a key intermediate for cleavage into the keto acid (VI) having the correct isomerism. Cleavage of the bicyclic alcohol (V) is conducted under mild oxidation with substantially neutral conditions. If the reaction conditions are too strongly acidic or too strongly basic, undesired isomeric configuration of the side chains of VI occurs. One method of conducting the mild oxidative cleavage of V to VI is to treat V with a small amount, catalytic amount or less than one equivalent of osmium tetraoxide in an organic solvent such as the ethers, hydrocarbons or mixtures thereof, which may contain water, followed by the addition of one equivalent or excess thereof of alkali metal metaperiodate such as sodium metaperiodate. The reaction is conducted at about room temperature or higher and is generally complete in about four to twenty-four hours.

The reaction results in the formation of a small amount of the aldehyde (IX) which can be converted into the alcohol (X) using mild conditions such as about one equivalent of sodium borohydride in aqueous methanol at about 5° C.

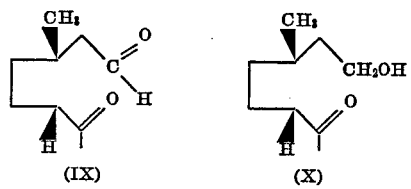

The cleavage of V using osmium tetraoxide and alkali metaperiodate also yields a small amount of a compound of Formula XI which upon treatment with lithium aluminum hydride in ether yields the triol (IX'). The triol (XI') is treated with periodate to furnish the keto-alcohol (X).

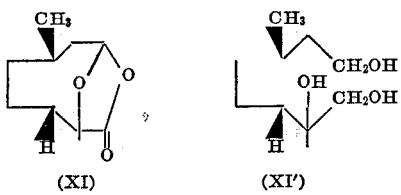

Cleavage of V can also be accomplished using permanganate ion under mild conditions. Another method of mild oxidative cleavage of V is the use of Brown reagent. In this method, one equivalent or more of aqueous sodium dichromate is added to a solution of V in benzene, ether or methylene chloride and then dilute sulfuric acid is added dropwise. Another method is to use ozonolysis or periodate-ruthenium tetraoxide oxidation.

The keto acid (VI) is then converted into the acid (VII) or ester thereof under conditions which retain the correct isomerism. It has been found that this conversion can be accomplished using a phosphorane of the formula $(R)_3P=CH_2$, in which R is aryl, cycloalkyl, aralkyl or dialkylamino, such as phenyl, benzyl, cyclohexyl, diethylamino, dimethylamino, and the like. Prior to the reaction with the phosphorane, keto acid (VI) can be converted into the corresponding ester using a diazoalkane or other mild conditions, preferably a lower alkyl ester containing 1–6 carbon atoms such as methyl or ethyl.

The acid (VII) or the ester thereof is then reduced to the desired alcohol (VIII) using a reducing agent such as a dialkylaluminum hydride, e.g. diethyl aluminum hydride of di-isobutylaluminum hydride, lithium or sodium aluminum dialkoxy dihydride, lithium aluminum tetrahydride, in an organic solvent such as the ethers or hydrocarbons. Other reducing agents such as lithium aluminum hydride and lithium borohydride can be used; however, in the case of lithium borohydride, the ester of VII should be used.

The following examples are provided to further illustrate the present invention. Temperature in degrees centigrade.

EXAMPLE 1

Preparation fo 2,6-dimethylbicyclo[4,2,0]oct-3-en-2-ol (V)

(A) A heterogeneous solution of 3 g. of 6-methylbicyclo[4,2,0]octan-2-one (II), 27 g. of ethyleneglycol and a few crystals of p-toluenesulfonic acid monohydrate in 125 ml. of dry benzene is heated under reflux in a Dean-Stark apparatus for 21 hours. After cooling, 0.2 ml. of pyridine and ether is added and the mixture is washed with saturated potassium bicarbonate solution followed by water, half saturated brine and finally saturated brine. The organic solution is dried over anhydrous sodium sulfate and evaporated under reduced pressure. The residue is distilled at 0.7 mm. to yield the cycloethylenedioxy of 6-methylbicyclo[4,2,0]octan-2-one, B.P. 54–57°.

(B) A solution of 1 g. of the thus-obtained ethylene ketal in 10 ml. of dry tetrahydrofuran is treated at room temperature with 2 g. of phenyltrimethylammonium tribromide with stirring and under nitrogen atmosphere. After one hour, the reaction is worked up by pouring into 5% potassium bicarbonate solution and extraction with ether. The ether extracts are washed with water and brine and dried over sodium sulfate. The solvent is evaporated under reduced pressure and the residue chromatographed on silica column using hexane:ethyl acetate (100:2.5–3.0) to yield the ethylene ketal of 3-bromo-6-methylbicyclo[4,2,0]octan-2-one.

(C) A mixture of 0.1 g. of the thus-obtained bromo ketal, 5 ml. of acetic acid, 0.25 ml. of water and 0.05 ml. of concentrated sulfuric acid is stirred at room temperature for about 2.3 hours. The mixture is then poured into water and extracted with ether. The ether extracts are washed with water, saturated potassium bicarbonate solution and brine. After drying over sodium sulfate, the solvent is removed by evaporation under reduced pressure to yield 3-bromo-6-methylbicyclo[4,2,0]octan-2-one (III).

(D) A mixture of 50 mg. of the thus-obtained bicyclic bromo ketone, 5 ml. of dimethylacetamide and 50 mg. of lithium carbonate is stirred under nitrogen atmosphere. The reaction mixture is allowed to warm up slowly and stirring continued for total reaction time of about 1.75 hours. The mixture is cooled, poured into 10% aqueous acetic acid and extracted with ether. The ether extracts are washed with water and brine and dried over sodium sulfate. The solvent is evaporated under reduced pressure to remove solvent components and from the liquid residue is separated 6-methylbicyclo[4,2,0]oct-3-en-2-one (IV) as the major component and 6-methylbicyclo[4,2,0]oct-3-en-2-one (IV') in a minor amount.

(E) To an ice cold solution of 0.1 g. of the enone (IV) in 8 ml. of dry ether under nitrogen is added 0.66 ml. of a 1.65 molar solution of methyl lithium in ether with stirring. After 45 minutes, saturated ammonium chloride is injected and the product isolated with ether. The solvent is removed under reduced pressure and the crude product recrystallized from pentane and trace of ether giving 2,6-dimethylbicyclo[4,2,0]oct-3-en-2-ol (V), M.P. 60–61.

EXAMPLE 2

Preparation of 1-methyl-2-acetyl-cyclobutyl acetic acid (VI)

To the allylic alcohol (1.2 g.) of Example 1 in 30 ml. of ether and 30 ml. of water is added 160 mg. of osmium tetraoxide in ether while stirring at room temperature. Sodium metaperiodate (10 g.) is added in portions over two hours. The mixture is then stirred at room temperature for 16 hours. Water is added to dissolve the precipitated iodate and the aqueous solution is twice extracted with ether. The combined ether extracts were made alkaline with 10% potassium bicarbonate.

The ethereal layer is separated, washed with water and brine, dried over sodium sulfate and evaporated to yield a mixture containing the aldehyde (IX; 1-methyl-2-acetyl-cyclobutyl acetaldehyde) and the lactone (XI).

The aqueous layer is combined with the first washing of the ethereal layer and made acidic with 10% HCl. The acidic solution is extracted twice with ether. The ether extracts are washed with brine, dried over sodium sulfate and evaporated to yield 1-methyl-2-acetyl-cyclobutyl acetic acid (VI), B.P. 58–60°/bath; 0.05 mm.

EXAMPLE 3

Preparation of methyl 1-methyl-2-acetyl-cyclobutyl acetate

Diazomethane is prepared by adding 1 g. of nitrosomethylurea to an ice cold mixture of 6.5 ml. of 40% potassium hydroxide and 17 ml. of ether.

To a solution of 0.2 g. of the keto acid (VI) in 7 ml. of ether is added about 3 molar equivalents of the freshly prepared diazomethane. Thereafter, the diazomethane is evaporated and the ether solution washed with brine and dried over sodium sulfate. The solvent is evaporated and liquid residue distilled to yield the methyl ester or the keto acid (VI), B.P. 60° (bath) 10 mm.

EXAMPLE 4

Preparation of methyl 1-methyl-2-isopropenyl-cyclobutyl acetate

Methylenetriphenylphosphorane is prepared from 984 mg. of methyltriphenylphosphonium bromide in 18 ml. of tetrahydrofuran and 2.0 ml. of n-butyl lithium (1.38 molar in heptane).

The ylid solution (7.1 ml.) is added dropwise to a solution of 0.17 g. of the keto-ester of Example 3 in 30 ml. of tetrahydrofuran over 12 minutes at room temperature and under an argon atmosphere. More ylid (1.5 equivalents) is added and reaction continued for total of 2.5 hours. The reaction mixture is poured into 10% potassium bicarbonate and the mixture extracted twice with pentane. The pentane solution is washed with brine, dried and evaporated to yield methyl 1-methyl-2-isopropenyl-cyclobutyl acetate, B.P. 60–65° (bath) 80 mm.

EXAMPLE 5

Preparation of cis 2-(1'-methyl-2'-isopropenyl-cyclobutyl)ethanol (VIII)

To a solution of 18 mg. of methyl 1-methyl-2-isopropenyl-cyclobutyl acetate in 2 ml. of ether is added 60 mg. of sodium dihydro bis(2-methoxyethoxy)aluminate (85 μl. of a 70% solution in benzene) while stirring at room temperature. Water is added after 15 minutes and the reaction mixture filtered. The filtrate is extracted with ether. The ether extracts are washed with brine, dried over sodium sulfate and evaporated to yield cis 2-(1'-methyl-2'-isopropenylcyclobutyl)ethanol which is purified by column chromatography on alumina.

EXAMPLE 6

Following the procedure of Example 1 (Part B), 6-methylbicyclo[4,2,0]octan-2-one is converted into 3-bromo-6-methylbicyclo[4,2,0]octan-2-one which is dehybrominated using the procedure of Example 1 (Part D) to yield 6-methylbicyclo[4,2,0]oct-3-en-2-one and 6-methylbicyclo[4,2,0]oct-4-en-2-one.

By using the procedure of Example 1 (Part B), 3-chloro-6-methylbicyclo[4,2,0]octan-2-one is prepared by the reaction of 6-methylbicyclo[4,2,0]octan-2-one and phenyltrimethylammonium trichloride.

EXAMPLE 7

A solution of methylenetriphenylphosphorane is prepared by adding 0.5 ml. of 1.38 molar n-butyl lithium in heptane to 0.246 g. of methyltriphenylphosphonium bromide in 4 ml. of dimethylsulfoxide:tertahydrofuran (1:1).

The ylid solution (0.277 ml.) is added via syringe to 2 mg. of 1-methyl-2-acetyl-cyclobutyl acetic acid in 0.1 ml. of dimethylsulfoxide under nitrogen. After 15 minutes, more ylid (one equivalent) is added and the mixture stirred for 15 minutes. The reaction mixture is poured into 10% potassium bicarbonate and the mixture extracted twice with pentane. The pentane solution is washed with brine, dried and evaporated. The residue is dissolved in ether, 10% potassium bicarbonate is added and the neutral portion removed with the ether layer. The aqeuous layer is acidified with dilute HCl and extracted twice with ether. The ether extracts are washed with brine, dried over sodium sulfate and concentrated to dryness under vacuum to give 1-methyl-2-isopropenyl-cyclobutyl acetic acid (VI).

EXAMPLE 8

Three equivalents of sodium dihydro bis(2-methoxyethoxy)aluminate (21.6 mg. in benzene) is added to 6 mg. of the olefinic acid (VI) in 1 ml. of dry ether while stirring under nitrogen. After 30 minutes, the reaction mixture is cooled to ice temperature and ice cold 5% potassium hydroxide solution is added until a clear solution is obtained. The ether layer is separated, washed with brine, dried over sodium sulfate and concentrated to dryness under vacuum to give 2-(1'-methyl-2'-isopropenyl-cyclobutyl)ethanol.

EXAMPLE 9

A solution of 0.2 of cis 1-methyl-2-acetylcyclobutyl acetaldehyde and one equivalent of sodium borohydride in 15 ml. of aqueous methanol is stirred at about 5°. The reaction is followed by thin layer chromatography and when complete is poured into water and extracted with methylene chloride. The extracts are combined, washed with aqueous sodium bicarbonate and then brine, dried over magnesium sulfate and evaporated under reduced pressure to yield cis 2-(1'-methyl-2'-acetyl-cyclobutyl)ethanol which is converted into cis 2-(1'-methyl-2'-isopropenyl-cyclobutyl)ethanol using the procedure of Example 4.

EXAMPLE 10

A solution of 0.2 g. of 6-methylbicyclo[4,2,0]octan-2-one in 8 ml. of chloroform at 0° is treated with one molar equivalent of bromine in carbon tetrachloride solution dropwise over a period of 10 minutes. Stirring is continued at 0° for one hour and then water is added. The chloroform layer is separated, washed successively with 10% potassium bicarbonate and brine, dried over sodium sulfate and evaporated to dryness under reduced pressure to yield 3-bromo-6-methylbicyclo[4,2,0]octan-2-one which is purified by chromatography on silica gel.

What is claimed is:

1. The compound, cis 1-methyl-2-isopropenyl-cyclobutyl acetic acid and lower alkyl esters thereof.

2. The compound, cis methyl-1-methyl-2-isopropenyl-cyclobutyl acetate, according to claim 1.

3. The compound, cis 1-methyl-2-isopropenylcyclobutyl acetic acid, according to claim 1.

References Cited

Bianchetti et al., Gazz. Chim. Ital. 97, 504, 1907.

LORRAINE A. WEINBERGER, Primary Examiner

R. GERSTL, Assistant Examiner

U.S. Cl. X.R.

260—514 H